Oscar G. Tweddell,
INVENTOR

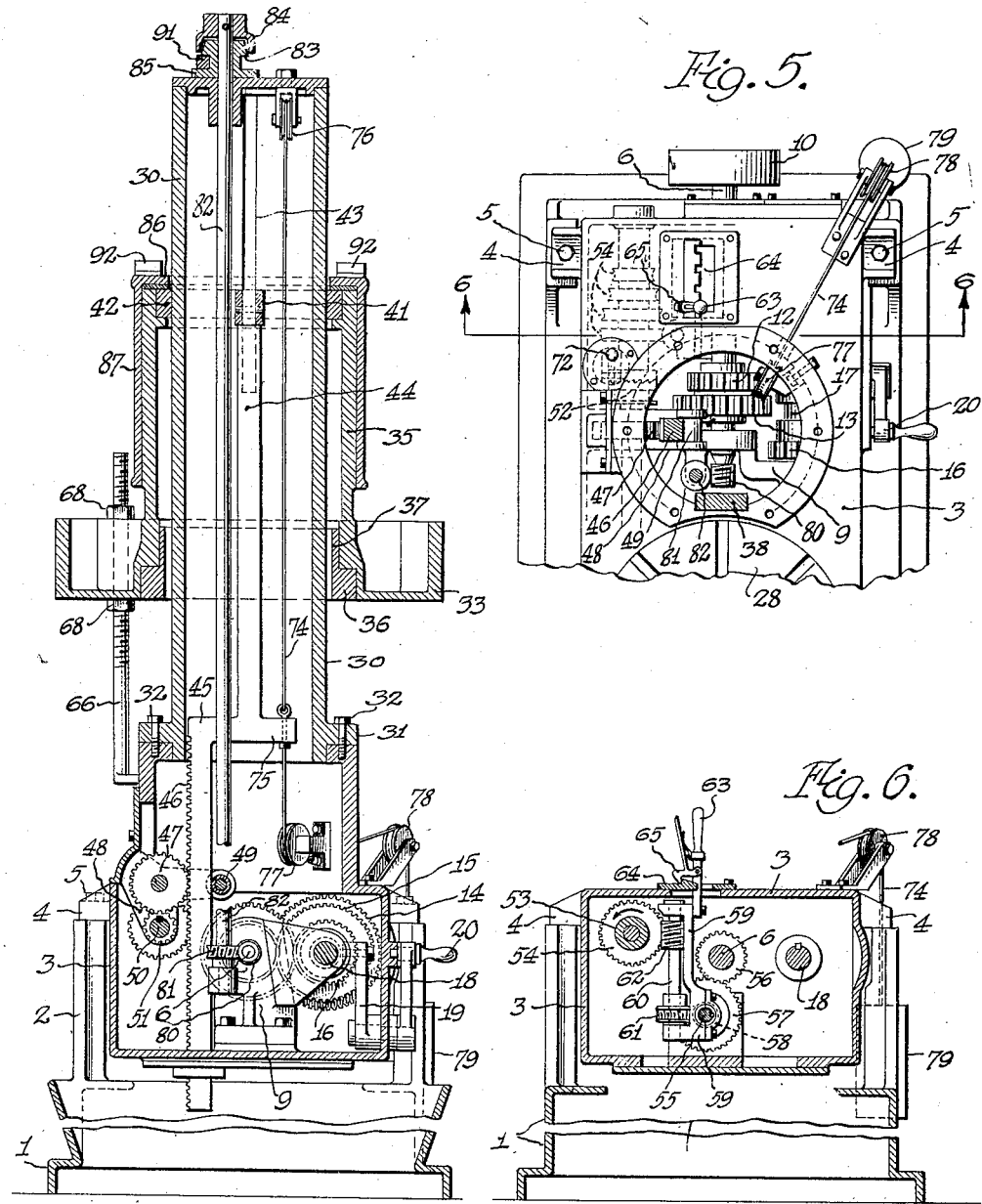

Dec. 2, 1930.  O. G. TWEDDELL  1,783,637
VERTICAL TURRET LATHE
Filed April 13, 1929  3 Sheets-Sheet 3
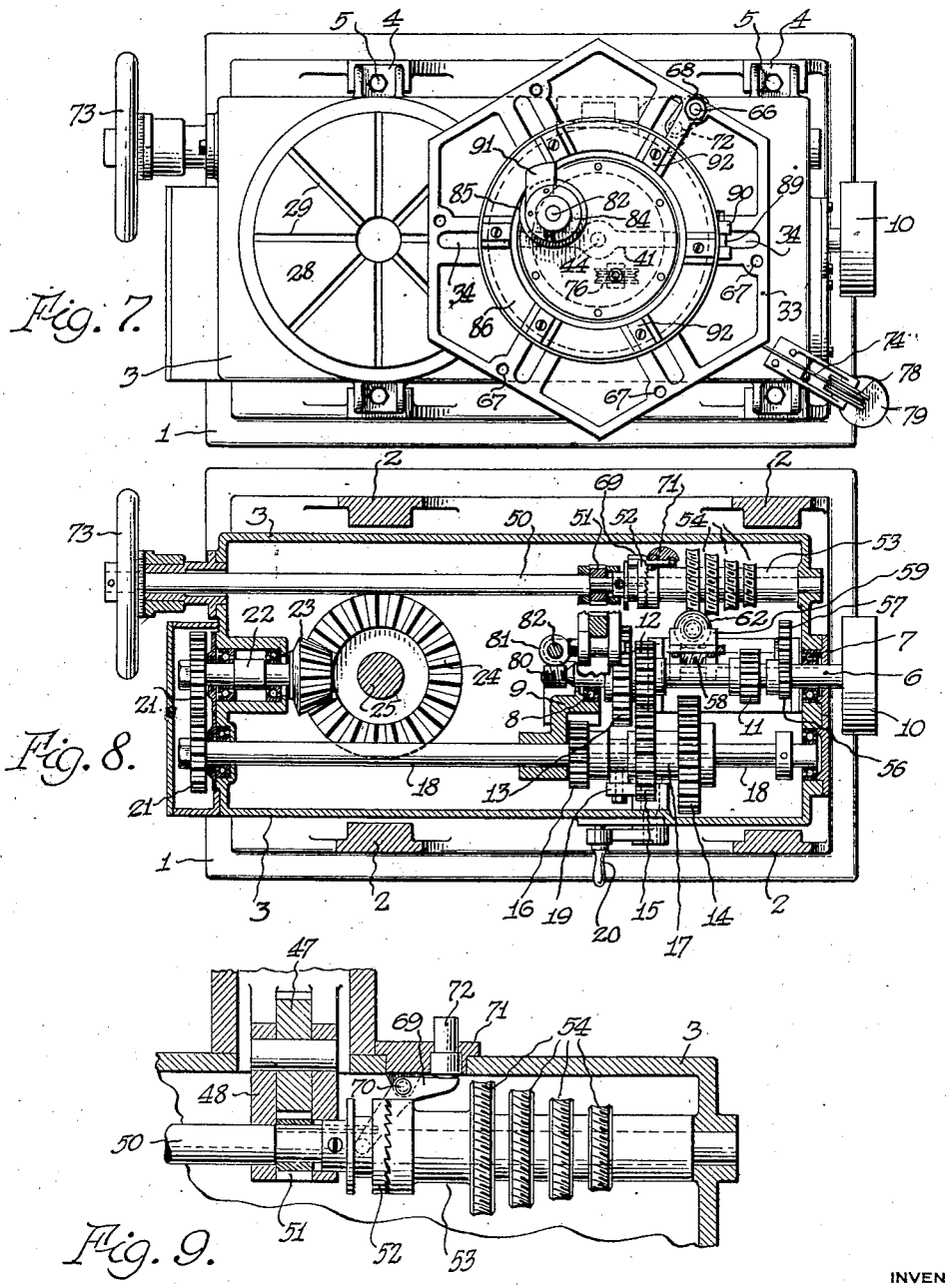

Patented Dec. 2, 1930

1,783,637

UNITED STATES PATENT OFFICE

OSCAR G. TWEDDELL, OF DETROIT, MICHIGAN, ASSIGNOR OF SIXTY PER CENT TO FREDERICH FIESSELMANN, OF DETROIT, MICHIGAN

VERTICAL TURRET LATHE

Application filed April 13, 1929. Serial No. 354,772.

This invention relates to a metal working machine of the type known as turret lathes and an object of the present invention is to conserve floor space and provide a machine which is automatic in its several operations and is more particularly adapted for use in machining comparatively large, heavy pieces of work. A further object is to provide an arrangement wherein the machine operates in a vertical position with a horizontally disposed rotatable work holder and vertically reciprocable indexing tool carrier, whereby convenience is secured in locating and positioning the work and in positioning and adjusting the several tools. It is also an object to provide suitable means for rotating and regulating the speed of rotation of the work holder, together with means for automatically controlling the feeding operation of the several tools and the automatic indexing of the tool carrier or turret. A further object is to provide certain other new and useful features in the construction, arrangement and combination of the several parts, elements or devices and driving mechanism therefor.

With the above and other ends in view, the invention consists in the vertical arrangement of a machine of this character providing a horizontally disposed work holder or table, a tool carrying turret movable vertically toward and from said table and rotatable in a horizontal plane to bring tools carried thereby successively into operative position relative to the work, together with change speed mechanism for controlling the relative speeds of movement of said tools and work, and means for effecting an automatic indexing movement of said turret. The invention further consists in the several other matters hereinafter set forth, and all as more particularly pointed out in the appended claims, reference being had to the accompanying drawings in which Figure 1 is a vertical section through a machine illustrative of an embodiment of the present invention;

Fig. 4 is a transverse vertical section substantially upon the line 4—4 of Fig. 1;

Fig. 5 is a plan view substantially upon the line 5—5 of Fig. 1 of a portion of the lower part of the machine with the vertical column thereof removed;

Fig. 6 is a transverse section of the base substantially upon the line 6—6 of Fig. 5;

Fig. 7 is a plan view of the machine;

Fig. 8 is a horizontal section through the base substantially upon the line 8—8 of Fig. 1; and Fig. 9 is an enlarged sectional detail of a clutch throw-out.

Figures 1, 2, 3:
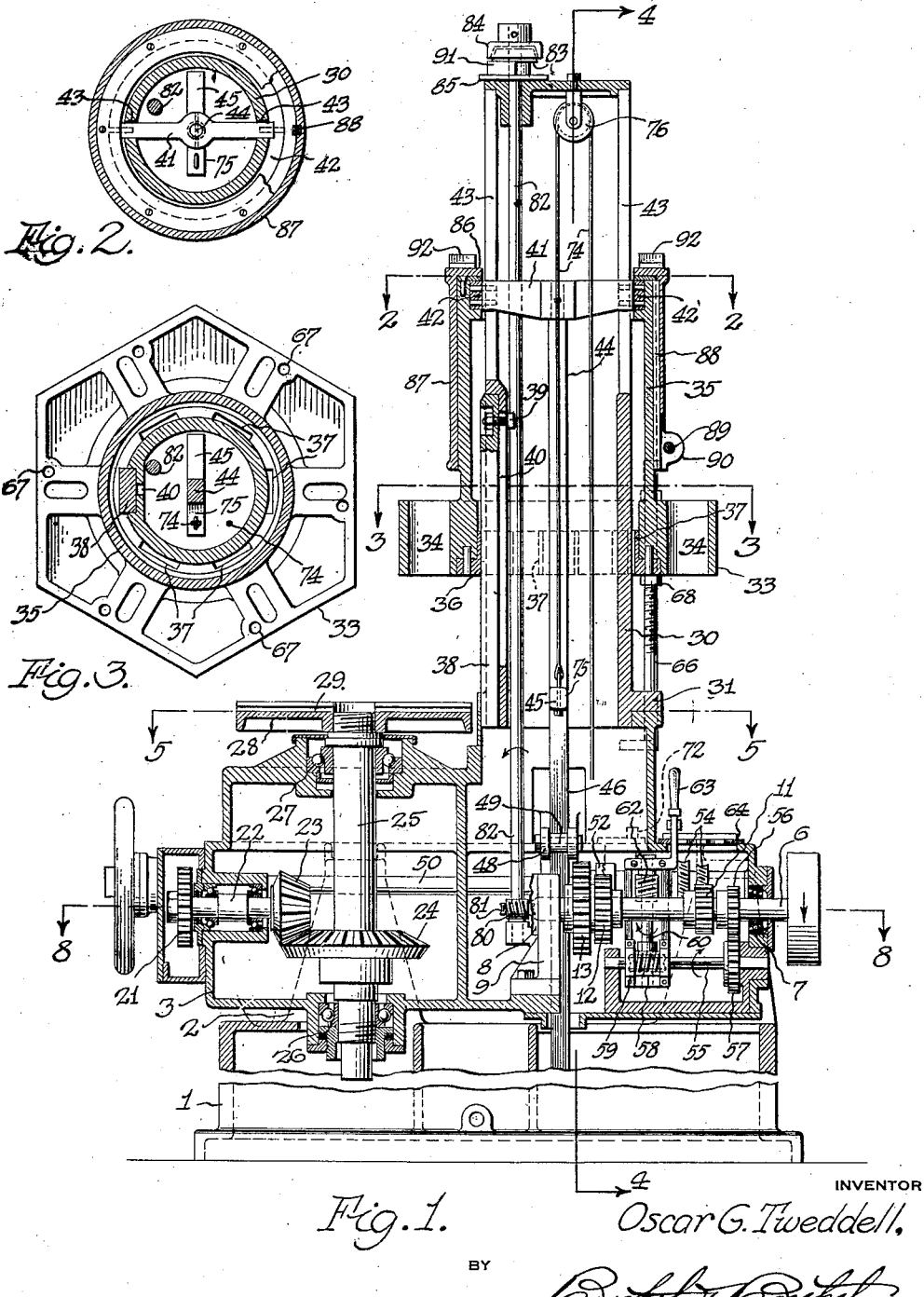
Fig. 2 is a horizontal section upon the line 2—2 of Fig. 1.
Fig. 3 is a horizontal section upon the line 3—3 of Fig. 1.

As shown in the accompanying drawings, a base 1 of suitable dimensions is provided with upright posts 2 upon the upper ends of which a casing 3 of rectangular form is detachably supported by lugs 4 extending laterally from the casing to rest upon the upper ends of the posts and to which they are secured by bolts 5. This casing forms a housing for all of the driving shafts and gearing, the main driving shaft 6 being mounted in a suitable bearing 7 on the end wall of the casing and a bearing 8 on a suitable bracket 9 bolted to the bottom of the casing and extending upwardly therein midway of its length.

On the outer end of this shaft is a pulley 10 or other means for the application of power thereto and secured to said shaft within the casing is a series of gears of different diameters adapted to mesh with gears 14, 15 and 16 secured to a sleeve 17 splined to and slidable longitudinally upon a countershaft 18 extending parallel with the shaft 6 and mounted in bearings on the ends of the casing. A crank member 19 is mounted on the side wall of the casing with its shaft extending through a bearing in said wall and with its crank end suitably engaged in a groove in said sleeve whereby the turning of said crank by means of a handle 20 on the outer end of its shaft, will shift said sleeve and gears into different meshing positions or into position where said gears are out of mesh, motion being transmitted from the drive shaft 6 to the counter shaft 18 at low speed when the gears 11 and 14 are in mesh, at intermediate speed when the gears 12 and 15 are brought into mesh, and at high speed when the gears 13 and 16 are engaged, the spacing of the gears on said sleeve being such that in one position of the sleeve, all of its gears will be out of mesh and no motion will be transmitted from the driving to the countershaft.

At the forward end of the shaft 18, a gear 21 is secured thereto to mesh with a like gear on the outer end of a stub shaft 22 mounted in suitable bearings on the end wall of the casing and extending inwardly a short distance parallel with the shaft 18 and provided on its inner end with a bevel pinion 23 in mesh with a bevel gear 24 on a vertical shaft 25 mounted in a suitable take-up bearing 26 at its lower end supported within a suitable opening in the bottom wall of the casing. The upper end of said shaft is mounted in a suitable thrust bearing 27 secured within a suitable seat therefor on the top wall of the casing, and detachably upon the upper projecting end of said shaft is a table or work supporting chuck 28 formed with radial slots 29, as shown or with any other suitable means for firmly clamping or securing pieces of work in proper position thereon, or said chuck table may be removed and any other suitable form of work holder substituted therefor upon the end of shaft 25.

The top wall or upper part of the casing 3, just laterally of the table 28, is formed to provide a seat for the lower end of a tubular column 30, which column is flanged as at 31, and rigidly secured to said seat by bolts 32. Surrounding this tubular column and adapted to reciprocate longitudinally thereof and to rotate thereon, is a turret or tool holder 33 comprising a hexagonal shaped member provided with a series of openings 34 or any other suitable means for receiving and holding cutting tools (not shown) of any design suitable to the work in hand. This tool holder is formed with an integral upwardly extending sleeve 35 surrounding the tubular column 30 and provided at its lower end with an inserted and hardened ring 36 which is formed with a series of internal slots or notches 37 adapted to receive a longitudinal key 38 rigidly and adjustably secured within a longitudinal channel in one side of the column 30, said key or gib 38 being adjustably held in its channel by means of a bolt 39 carried by the key and adjustable within a slot 40 in the bottom wall of the channel, said channel being open at the lower end of the column so that the key may be adjusted endwise, its lower end projecting into the casing 3 when so adjusted downwardly. This key thus forms an accurate guide for the lower end of the turret 33 in its reciprocating movement and prevents rotation thereof during its reciprocation, and the sleeve 35 of said turret is guided at its upper end by a cross-head 41 secured at its ends to a ring 42 rotatable within an internal groove in said sleeve with said cross-head extending diametrically through slots 43 in opposite sides of the column 30.

Vertically reciprocative movement is imparted to the turret 33 by means of a bar 44 positioned axially of the column 30 and secured at its upper end to said cross-head 41. Adjacent the lower end of said column, said bar is offset laterally as at 45 (Fig. 4) and the portion extending downwardly from said offset is provided with teeth at one side, thus forming a rack-bar 46 with its teeth in mesh with an idler gear 47 mounted on a bracket 48 (see Figs. 4 and 9) carrying a guide roller 49 to engage the back of the rack and hold the same in engagement with the idler. On a second countershaft 50 extending parallel with the main shaft 6 is a pinion 51 in mesh with the idler 47, said pinion 51 being splined to the shaft to turn therewith and to permit said shaft to slide longitudinally therethrough, said shaft 50 and pinion 51 being mounted in the bracket 48 so that the shaft may move endwise therethrough and the pinion will be held by the bracket against endwise movement with the shaft. On said shaft adjacent said pinion and secured to the shaft to turn and to move longitudinally therewith, is a clutch member 52 formed with end teeth to mesh with like teeth on the end of a sleeve 53 mounted for free rotation on the shaft, and on this sleeve are formed a series of worm gears 54 of graduated diameters.

Motion is transmitted from the main drive shaft 6 to the sleeve 53 by providing a short shaft 55 (see Fig. 6) mounted in bearings in the casing below the drive shaft with a pinion 56 on the driveshaft in mesh with a gear 57 on the shaft 55, said shaft 55 being provided with a worm pinion 58 (see Fig. 1) splined to said shaft to turn therewith and to move longitudinally thereof, said worm 58 being embraced by the lower end of a bracket 59 pivotally supported on the shaft for swinging movement thereon, said bracket being formed with bearings for a short vertical shaft 60 carried by and extending upwardly along the bracket to move therewith, said shaft 60 having secured thereon a worm gear 61 in constant mesh with the worm 58 to transmit motion from the shaft 55 to the shaft 60, which shaft 60 has secured thereto adjacent its upper end, a worm 62 adapted to be brought into mesh with any one of the series of worm gears 54 upon the sleeve 53, by moving the bracket 59 along the shaft 55 and then swinging said bracket laterally to bring the worm 62 into mesh with the proper worm gear of the series 54 to drive the sleeve 53 at the desired speed, a handle 63 being provided on the upper end of the bracket 59 to move the same, said handle being extended upward through an opening in the top of the casing 3 adjacent a plate 64 having a series of notches corresponding to the positions of the worm gears 54 with said handle provided with a latch 65 for holding it engaged in any one of the notches and the worm 62 in mesh with the particular gear 54 desired.

The speed of downward movement to the turret and therefore the speed of the downward movement of the cutting tools carried thereby, relative to the speed of rotation of the table 28 and work thereon, may therefore, be accurately regulated by shifting the change speed gears carried by the sleeve 17 and shifted by the hand crank 20 to regulate the speed of rotation of the work, and by changing the speed of rotation of the shaft 50 by shifting the worm 62 into mesh with the desired worm gear of the series 54 by means of the hand lever 63.

To stop the transmission of power to the turret at the lower end of its stroke, one or more stop rods 66 (Fig. 4) are secured within a series of openings 67 provided therefor (Figs. 3 and 7) in the tool head or carrier 33 which forms a part of the turret, said rod or rods being screw-threaded throughout their upper end portions and held in said openings adjustably, by nuts 68 on said rods engaging the upper and lower end surfaces of the head, and therefore said rods may be adjusted endwise relative to said head by adjusting said nuts.

As shown in detail in Fig. 9, a bell-crank lever 69 is pivotally supported at 70 upon an insert 71 set within an opening in the top wall of the casing 3, with one arm of the lever extending beneath a push pin 72 mounted in an opening in the insert 71, the opposite or long arm of the lever being operatively engaged with the clutch member 52 which is secured to the shaft 50. Therefore when the turret approaches the lower end of its stroke, one of said rods 66 will be directly above the outer end of the pin 72, and upon further downward movement of the turret, said rod will engage said pin and push it inward, thereby turning the bell-crank lever 69 and shifting the clutch member 52 out of engagement with the sleeve 53, thereby stopping the transmission of motion to the pinion 51 which, through its engagement with the gear 47, actuates the rack bar 46 which is connected through the crosshead 41 with the sleeve 35 of the turret. One or more of the stop rods 66 may be used and adjusted according to the number of tools mounted on the carrier 33 and according to the desired stroke or movement of each of said tools.

When the clutch member 52 is moved as described to stop the downward movement of the turret at the lower end of its stroke, the shaft 50 is also moved endwise as the clutch member is secured to the shaft, and as this shaft 50 extends through the forward end wall of the casing 3, its end is provided with a hand wheel 73 outside the casing, by means of which said shaft 50 may be rotated or moved endwise. As the shaft 50 is moved outwardly by the throwing out of the clutch member 52 at the lower end of the stroke of the turret, the said shaft is free to turn and therefore the operator may rotate said shaft in a reverse direction to raise the turret through the engagement of the pinion 51, which is keyed to the shaft, with the gear 47, which is in constant mesh with the rack bar 46.

To assist in such upward movement of the turret and operate as a counterbalance for the weight of said turret and parts connected thereto, a cable 74 is attached at one end to a laterally projecting arm 75 on the bar 44 opposite the offset 45 thereof, and this cable is extended upwardly within the column 30 and over a pulley 76, thence downwardly in the column and beneath a pulley 77 and out through an opening in the base of the column where it is then led over a third pulley 78 at the end of the casing 3 and provided with a weight member 79 attached to its downwardly extending end portion.

The turret may therefore be readily moved into its elevated position or to the upper end of its stroke, by the manual operation of the hand wheel 73, and when it has been so elevated, the clutch 52 may then again be moved into mesh to transmit motion to the rack 46 and again move the turret downwardly by power, by simply pushing inwardly on the hand wheel, thus moving the shaft 50 endwise to bring the clutch member into driving engagement with the sleeve 53.

In order that the turret may be automatically turned upon the column 30 or indexed around for the purpose of bringing another cutting tool into position above the work after one tool has taken a cut and the turret has been moved to the upper end of its stroke, power is transmitted to the upper end of said column from the main driving shaft 6, by means of a worm 80 on the inner end of said shaft, in mesh with a worm gear 81 on a vertical shaft 82 which extends upwardly in the column to and through a suitable bearing on the upper end of the column. Free to rotate upon the outer end of this shaft 82 is a friction clutch member 83 of cone shape and secured to the outer end of said shaft is a friction cup member 84 adapted to receive the cone when said cone is moved longitudinally of the shaft upwardly into the cup, said cup when said cone is thus brought into engagement therewith, serving to transmit rotary motion from the shaft to the cone.

Before the turret can turn upon the column 30, said turret must be moved upward on the column far enough to disengage the ring or insert 36 carried by the tool holder 33, from engagement with the upper end of the gib 38 on the column, and therefore the turret must be elevated until the lower face of the tool holder 33 is above the upper end of the gib 38 which movement, due to the proportioning of the length of the sleeve 35 relative to the distance from the upper end of the gib to the upper end of the column, will bring the upper end of the turret into engagement with the bottom flange 85 on the cone 83, which flange projects far enough beyond the side of the upper end of the column to be in the path of an inwardly extending flange 86 on the upper end of a sleeve 87 sleeved over the sleeve 35 and adjustable longitudinally thereon but held against rotation relative thereto by a spline or key 88, said outer sleeve 87 being held in the position to which it is adjusted longitudinally upon the sleeve 35 by means of a clamping bolt 89 passing through openings in ears 90 on the lower end of the sleeve 87 at each side of a split in the sleeve (see Fig. 1). When the flange 86 strikes the cone 83, said cone is moved into frictional engagement with its cup 84 and motion is transmitted from the shaft 82 to rotate the cone, to which cone is rigidly secured, as shown in Fig. 7, a laterally projecting arm 91, and a series of blocks or abutments 92 is secured to the flange 86, said blocks corresponding in number to the number stations at which cutting tools are carried by said carrier 33 so that as the cone member 83 is lifted into frictional engagement with the cup member 84 and rotated thereby, said arm 91 on the cone will be swung into engagement with one of the blocks 92, and due to the eccentric positioning of the shaft 82 relative to the axis of rotation of the sleeves 35 and 87, said arm 91 will impart a short turning movement to said sleeves and tool carrier 33, sufficient to bring the next tool station into operative position, and will then pass out of contact with said block, leaving the turret in the new position with one of the notches 37 in the insert 36 in alignment with the upper end of the gib 38 which, upon downward movement of the turret, will engage in said notch and accurately guide and hold the turret during the downward working stroke, and due to such re-engagement of the gib with the turret, extreme accuracy in the indexing movement is unnecessary.

Should it be desirable to shorten the reciprocating stroke of the turret, it is only necessary to adjust the sleeve 87 upwardly relative to the sleeve 35 so that the upward movement of the turret before engaging and lifting the clutch member 83, will be shortened, and at the same time adjusting the gib 38 downwardly in its groove so that the insert 36 carried by the carrier 33 will pass out of engagement with the upper end of said gib, just before the turret reaches the upper end of its strike and operates the clutch member 83.

The turning or indexing movement of the turret comprising the sleeves 87 and 35 and the carrier 33, relative to the crosshead 41 which serves to impart reciprocative movement to the turret, is permitted by reason of the ring 42 to which the crosshead is secured at its ends and upon which the sleeve 35 rotates, and thus said turret may be freely indexed around to the desired position when said turret is at the upper end of its stroke and out of engagement with the upper end of the gib 38, and this indexing movement will continue as long as the check members 83 and 74 are held in frictional engagement by the holding of the turret at the upper end of its stroke.

Obviously any suitable work carrier holder or support may be substituted for the table 28 according to the kind of work in hand, any such holder being actuated to impart a rotary movement to the work, by means of the vertical shaft 25, and therefore the weight of the work and thrust of the cutting tools is taken by said shaft, endwise thereof, giving greater accuracy and permitting of the machining of much larger and heavier pieces of work than could otherwise be handled. It is obvious that various kinds of work may be done by providing the proper cutting tools which may be attached to and carried by the carrier 33 by means of brackets or other suitable tool holding means applied to the end or side faces of the carrier to hold the cutting tools in the desired angular relation to the work.

This arrangement of vertical column for the vertical reciprocation thereon of a turret, together with the vertical shaft for rotating the work not only provides for the accurate machining of heavy work but effects a very material saving in floor space, and by inclosing all shafts, gearing, etc., within a casing separate from the supporting base, a number of these machines each including this casing and column thereon, may be assembled upon a single base in the desired relation and arrangement so that one operator may attend several machines.

Obviously other changes may be made in the details of construction and arrangement, within the scope of the appended claims, without departing from the spirit of the invention, and I do not therefore limit myself to the construction shown.

Having thus fully described my invention, what I claim is:

1. In a machine of the character described, the combination of a work support rotatable upon a vertical axis, a vertical tubular column positioned laterally of said work support, a turret reciprocable upon said column and rotatable thereon in a horizontal plane, said turret being adapted to carry a plurality of tools, means on said column to engage and hold said turret against rotation during a portion of the reciprocative stroke of said turret, said turret being adapted to move out of engagement with said means to permit rotation of said turret during a portion of said stroke, means for imparting rotation to said work support and simultaneously moving said turret in a downward direction to engage said turret holding means and prevent rotation of said turret on said column during the feeding of the tools to the work, means operated by the downward movement of the turret for stopping the transmission of movement to said work support and turret at the lower end of the stroke of said turret, separate means for imparting upward movement to said turret, and means engaged by said turret at the upward end of its stroke for imparting an indexing movement to said turret.

2. In a machine of the character described, the combination of a work support, a vertical column positioned laterally of said support, a turret for carrying a plurality of tools arranged for vertical reciprocation on said column to impart a feeding movement to said tools and for rotative movement to bring said tools successively into operative relation to the work, power means for imparting a downward movement to said turret on said column, separately operative means for imparting an upward movement to said turret, a spline on said column to guide and hold said turret throughout a portion only of its reciprocation, and indexing mechanism carried by said column for rotating said turret with a step by step movement, said indexing mechanism being engaged and operated by the upward movement of said turret.

3. In a machine of the character described, the combination of a work support, a vertical column positioned laterally of said support, a turret for carrying a plurality of tools arranged for vertical reciprocation on said column to impart a feeding movement to said tools and for rotative movement to bring said tools successively into operative relation to the work, power means for imparting a downward movement to said turret on said column, separately operative means for imparting an upward movement to said turret, indexing mechanism carried by said column for rotating said turret with a step by step movement, means for driving said indexing mechanism, a clutch device for connecting said driving and indexing means, said clutch being operated by the upward movement of said turret and at the upper end of its stroke, and means for adjusting the length of stroke of said turret in its reciprocating movement.

4. In a machine of the character described, the combination of a work support rotatable upon a vertical axis, a vertical column positioned laterally of said work support, a turret for carrying a plurality of tools mounted on said column for vertical reciprocation thereon to impart a feeding movement to said tools and having a rotative movement to bring the tools successively into operative position relative to the work, a cross-head connected to said turret and reciprocable in said column, means in said column for reciprocating said cross-head and turret, said cross-head being guided and held against rotation by said column, indexing mechanism on the upper end of said column, driving means for the indexing mechanism extending upwardly in the column, and means operated by said turret at the upper end of its stroke for connecting said driving means and indexing mechanism.

5. In a machine of the character described, the combination of a turret adapted to carry a plurality of tools, a tubular vertical fixed column upon which said turret is reciprocable and rotatable, a shaft extending upwardly in said column, means for rotating said shaft and transmitting motion upwardly in said column to reciprocate said turret, means adjustable longitudinally of said column for guiding said turret in its reciprocative movement upon said column and for preventing rotation of said turret thereon, said turret being arranged to pass out of engagement with said means adjacent the upper end of its reciprocative stroke to permit rotation, an arm on said shaft to intermittently operate said turret, and means operated by said turret at the upper end of its reciprocative movement for connecting said arm to said shaft.

6. In a machine of the character described, the combination of a vertical shaft having means at its upper end for the support of work thereon, a vertical column, means for rotating said shaft and transmitting motion upwardly in said column, a turret adapted to carry a plurality of tools and reciprocable upon said column, said turret having a plurality of internal notches, a spline on the column to engage one of said notches and disengaged therefrom adjacent the upper end of reciprocative movement of said turret, and means for imparting a step by step rotative movement to said turret operatively connected to said motion transmitting means in said column when said turret is at the upper end of its reciprocative stroke.

7. In a machine of the character described, the combination of a work support rotatable upon a vertical axis, a vertical column adjacent said work support, a turret mounted upon said column and having a series of stations at which tools are secured thereto, said turret having a notch therein at each station, a spline member on said column to engage one of said notches and prevent rotation of said turret upon said column during its reciprocative movement, said turret being adapted to pass out of engagement with said spline on its upward movement and to reengage the same upon downward movement, means for rotating said turret with a step by step movement when disengaged from said spline, and adjustable means on said turret for making effective said turret rotating means in rotating said turret when at the upper end of its reciprocative stroke.

8. In a machine of the character described, the combination of a work support rotatable upon a vertical axis, a vertical column adjacent said work support, a turret mounted upon said column and having a series of stations at which tools are secured thereto, said turret having a notch therein at each station, a spline member on said column to engage one of said notches and prevent rotation of said turret upon said column during its reciprocative movement, said turret being adapted to pass out of engagement with said spline on its upward movement and to reengage the same upon downward movement, said spline being adjustable longitudinally, a sleeve longitudinally adjustable upon said turret, means for rotating said turret, said sleeve having a member positioned at each station of the turret to be engaged by said turret rotating means, and means for rotating said work support and simultaneously imparting a downward movement to said turret.

9. A machine as characterized in claim 7 and further characterized in that said means for rotating said turret with a step by step movement includes a rotatable shaft extending upwardly within said column, a member on the upper end of said shaft having a laterally extending portion, a clutch for connecting said member to said shaft to turn therewith, and a member at each station on the turret to be engaged by said laterally extending portion on said member on said shaft.

10. In a machine of the character described, the combination of a supporting base substantially rectangular in plan view and having a vertical supporting post near each corner, a casing detachably secured to and supported upon said posts, work supporting means including a vertical shaft in said casing extending through the top thereof and provided with a work support on its outer end, a tubular column detachably mounted on said casing adjacent said work support, a turret having a sleeve mounted on said column for rotation and reciprocation thereon, a cross head carried by said sleeve, motion transmitting means in said casing for transmitting motion to rotate said vertical shaft, means including a rack bar extending upwardly in said column and attached at its upper end to said cross head, operated by said motion transmitting means for reciprocating said turret, and means within said column for transmitting motion from said motion transmitting means in said casing to rotate said turret.

11. In a machine of the character described, the combination of a work support including a vertical shaft, a horizontal power shaft, a horizontal motion transmitting shaft for transmitting motion to said vertical shaft, change speed mechanism for transmitting motion from said power shaft to said horizontal shaft, a hollow vertical column, a horizontally disposed turret reciprocable and rotatable upon column, means for reciprocating said turret extending upwardly in said column, change speed mechanism for transmitting motion to said turret reciprocating means, means operated by downward movement of said turret for effecting a disconnection between said turret reciprocating means and said change speed mechanism at the lower end of the downward movement of said turret, a vertical shaft in said column driven by said power shaft, means at the upper end of said column for rotating said turret with a step by step movement, and a clutch for transmitting motion from said vertical shaft in said column to said turret rotating means, said clutch being controlled in its operation by the upward movement of said turret.

In testimony whereof I affix my signature.

OSCAR G. TWEDDELL.